L. R. NELSON.
PROCESS OR METHOD FOR MAKING HOSE CONNECTORS OR COUPLINGS.
APPLICATION FILED APR. 24, 1916.
1,321,323.
Patented Nov. 11, 1919.
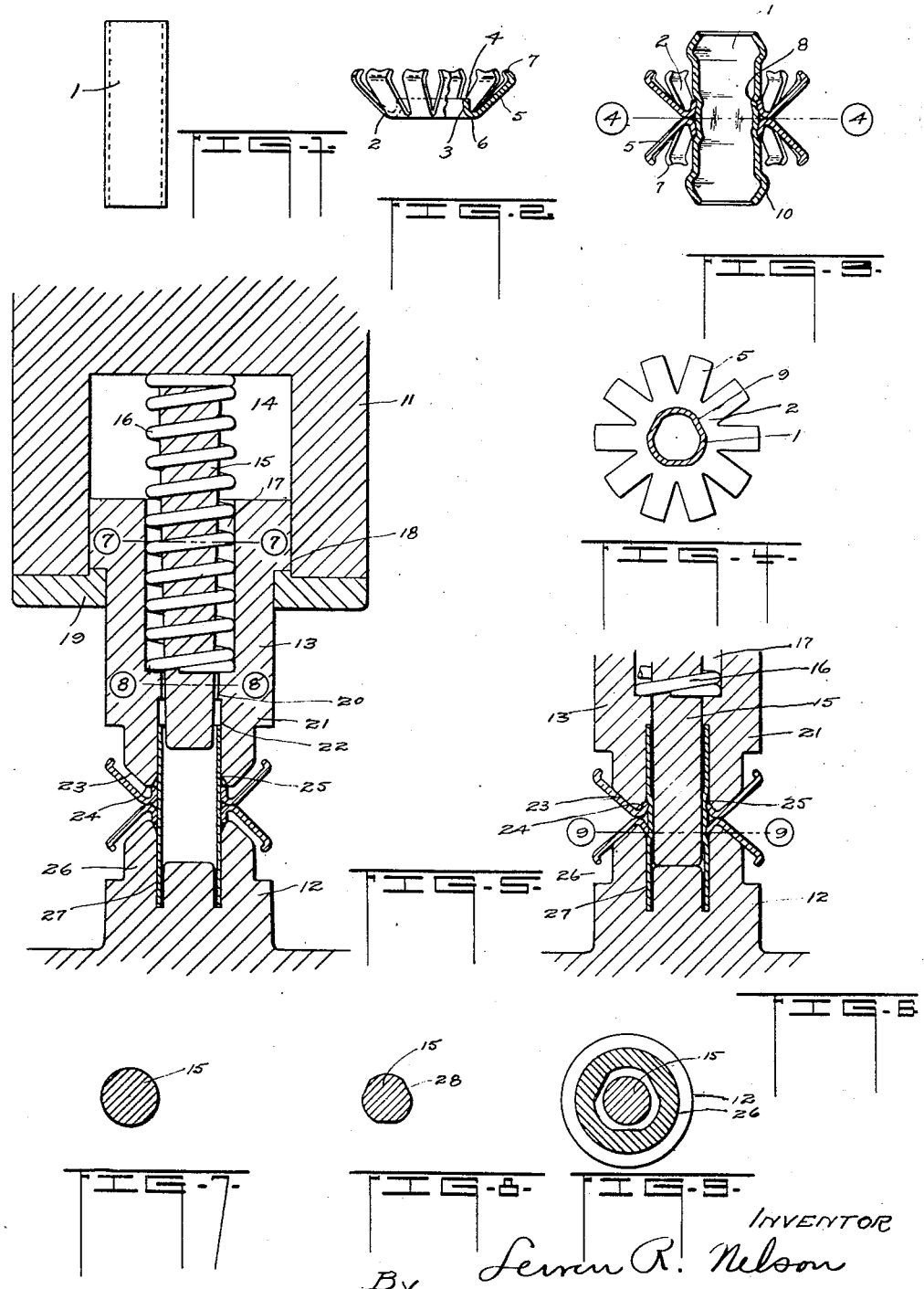

UNITED STATES PATENT OFFICE.

LEWEN R. NELSON, OF PEORIA, ILLINOIS.

PROCESS OR METHOD FOR MAKING HOSE CONNECTORS OR COUPLINGS.

1,321,323.   Specification of Letters Patent.   Patented Nov. 11, 1919.

Application filed April 24, 1916. Serial No. 93,082.

*To all whom it may concern:*

Be it known that I, LEWEN R. NELSON, a citizen of the United States, a resident of Peoria, in the county of Peoria and State of Illinois, have invented new and useful Improvements in Processes or Methods for Making Hose Connectors or Couplings, of which the following is a specification.

My invention relates to improvements in a method for making hose connectors or couplings, which are devices for connecting or joining the ends of sections of hose, or for connecting the ends of a broken hose together or for attaching the end of a hose to the standard hose coupling used for coupling the hose to a faucet, pipe or the like or connecting hose sections together.

The principal object of this invention is the provision of a process or method whereby a simple and strong device of the character specified may be readily made, the parts of which are properly formed and securely held together so as to obviate the possibility of giving inefficient service.

To the accomplishment of the foregoing and such other objects as may hereinafter appear, my invention consists in the process or method hereinafter described and then sought to be defined in the appended claims, reference being had to the accompanying drawing forming a part hereof and which shows illustratively one manner of carrying out the improved process or method, it being understood, however, that the steps or operations may be varied in practice within the scope of the claims without digressing from my inventive idea.

In the drawings,

Figure 1 represents an elevational view of the tubular blank which forms the connecting member in a completed device;

Fig. 2 is an elevational view partly in section, of one of the hose engaging members before application and securing to the tubular blank;

Fig. 3 is a longitudinal sectional view through a completed article embodying my invention and made according to my improved process or method;

Fig. 4 is a transverse sectional view taken on line 4—4 of Fig. 3;

Fig. 5 is a longitudinal vertical section through the die members used in forming my new article and in carrying out my improved process or method, a tubular blank and the pair of hose engaging members being shown in the position assumed just before the forming and securing operation is begun;

Fig. 6 is a view similar to Fig. 5 of the forming parts and the article, after the forming operation is completed;

Fig. 7 and Fig. 8 are cross sectional views on line 7—7 and 8—8, respectively, of Fig. 5.

Fig. 9 represents a view of a slight modification of the die taken on a section corresponding to line 9—9 of Fig. 6.

Throughout the drawings the same reference characters are used to designate like parts.

As stated before, this invention has reference to that class of devices which are known as hose connectors or hose couplings and particularly, to that type which has a tubular connecting member having hose engaging members provided thereon, which hose engaging members include bendable fingers which are adapted to be driven into the hose to make a secure and permanent connection as disclosed in my prior Patents No. 946,703, January 18th, 1910 and No. 1,051,621, January 28th, 1913. In the manufacture of these devices the tubular blanks used for the connecting member are either drawn or spun or else are welded, the former being the "seamless" blanks and the latter having a seam where welded.

The use of the welded blanks results in the forming of defective connectors, due to splits and other defects along the seam. This is due to the fact that previous to this invention the tubular blanks were swelled or forced outwardly on each side of the hose engaging members so that they would fit more or less tightly in a depression. As the welded blanks are considerably cheaper than the seamless blank, the consequent use of the seamless blank has necessarily increased the expense of manufacture. In manufacturing these articles according to my improved process or method, the welded blanks are just as practicable as the seamless blanks, so that the cost of manufacture is materially reduced. In my new process the blanks have a diameter of maximum size and the hose engaging members are pressed or pinched inwardly for the purpose of securing or fixing them to the blank, thereby reducing materially the possibility of making defective articles.

Referring now to the drawings, the numeral 1 designates the tubular blank which forms the connecting member in the completed article. The numeral 2 designates the hose engaging member which has the collar or sleeve portion 3 terminating in the lip or flange 4 and having the rearwardly and outwardly extending fingers or lugs 5 merging into the curved surface or portion 6 thereof. These lugs or fingers 5 have the bent engaging ends 7 for driving into the hose. In a completed article shown in Fig. 3, it is seen that I utilize a pair of the hose engaging members placed face to face with the fingers or lugs 5 extending in opposite directions therefrom and having the lip or flange 4 pressed or pinched inwardly, to bite into the tubular connecting member 1 as at 8. This of course slightly reduces the diameter of the tube 1 and holds the hose engaging member securely against longitudinal movement. Due to the fact that the bites or depressions 8 have flat faces as shown at 9, Fig. 4, the hose engaging members are held against relative rotary movement to each other and to the tube 1. The beads or heads 10 are formed thereafter.

The method or process of making this article is illustrated particularly in Figs. 5 and 6 to which reference will now be had, the former showing the tubular blank and the hose engaging member before operation and the latter showing them after the operation is complete.

The numeral 11 designates the upper die and the numeral 12 the lower die or anvil. The upper die has the forming member or plunger 13 slidably mounted in socket 14 and embracing the post member 15 which forms the mandrel or core coöperating therewith. Spring 16 embraces the post and extends within the socket 17 in the forming member or plunger 13 so as to normally hold the same in the position shown in Fig. 5. This forming member or plunger 13 has a shoulder 18 to engage the abutment member 19 to limit its outward movement. It is also provided with the restricted passage 20 through which the post 15 passes and also has the forming head 21 which is provided with the socket 22, the internal diameter of which corresponds to the external diameter of the tubular blank so as to receive the same therein. This forming head has the outer surface of its end portion beveled as at 23 up to the rounded edge 24, the inner surface also being beveled as at 25 and merging into the rounded edge 24. The diameter of the annular rounded edge 24 is slightly greater than the diameter of the annular lip or flange 4 of the hose engaging member, as clearly shown in Fig. 5.

The lower die or anvil member 12 is provided with a similarly shaped forming head 26 which is stationary and which has the socket 27 to receive the tubular blank 1. The post 15 which forms the core or mandrel member is circular for the greater portion of its length as indicated in Fig. 7, but has the lower portion thereof provided with a plurality of flat faces 28, as shown clearly in Fig. 8 of the drawing.

The method of manufacturing these articles is as follows: A blank 1 with a pair of oppositely disposed hose engaging members 2 is placed on the lower die or anvil member 12. The upper die member is caused to descend and moves to the position shown in Fig. 5, when, due to the engagement of the rounded edge 24 with the flange or lip 4 of the upper hose engaging member 2, the forming member or plunger 13 will remain stationary, the spring 16 being compressed as is well understood. This results in the core or mandrel member 15 continuing to descend and to pass through the tube 1. The rear end of the socket 14 then engages the forming member or plunger 13 and positively forces the same downwardly. This results in the pressing or biting inwardly of the flange or lip 4 of the hose engaging members 2, it being recalled that both die members have similarly shaped forming heads. It is to be noted that the diameter of the core or mandrel member 15 is slightly less than the diameter of the tube so as to permit the material of the tube being forced inwardly. Due to the flat surfaces 28 on this core or mandrel member, the inwardly pressed portions of the flange or lip 4 will assume a corresponding shape; that is, polysided, thereby securely locking the hose engaging members to the tubular blank against rotary movement relative thereto and against longitudinal movement relative thereto.

It is therefore seen that in manufacturing these articles according to this process, at no time is the tubular blank subjected to an expanding force but is only subjected to a pressure inwardly or a contracting force over two restricted areas. This will necessarily materially decrease the possibility of forming defects in the tubular blanks which would result in leakage and inefficient service.

In Fig. 9, I have indicated a slight modification in the form of the die that may be used in the making of these devices. This sectional view is taken along the line corresponding to line 9—9 in Fig. 6 and shows the mandrel or core 15 as being circular in section and showing the forming heads which correspond to those designated 21 and 26 as having the inner face thereof provided with a plurality of straight faces 29, so that when the machine is operated the flange or collar of the hose engaging members will be forced inwardly to bite into the tubular connecting member along a plurality of straight lines and thereby hold the parts securely together.

What I claim is:

1. The herein described method of making hose connectors or couplings, which consists in providing a tubular blank and placing hose engaging members thereon, pressing portions of said hose engaging members inwardly to bite into said tubular blank.

2. The herein described method of making hose connectors or couplings, which consists in providing a tubular blank and placing hose engaging members thereon, pressing portions of said hose engaging members inwardly against flat surfaces to bite into said tube along corresponding straight lines and lock the parts together.

3. The herein described method of making hose connectors or couplings, which consists in providing a tubular blank of the maximum required diameter and also hose engaging members having flange portions adapted to embrace said tubular blank, pressing portions of said flange portions inwardly to bite into said tubular blank.

4. The herein described method of making hose connectors or couplings, which consists in providing a tubular blank of the maximum required diameter and also hose engaging members having flange portions adapted to embrace said tubular blank, pressing said flange portions inwardly against an element having a plurality of flat surfaces so as to bite into said tube along straight lines corresponding to said flat surfaces and thereby lock the parts together.

5. The herein described method of making hose connectors or couplings, which consists in providing a tubular blank and also hose engaging members, said hose engaging members each having an aperture therethrough and formed with an annular flange adapted to embrace said tubular blank, and pressing portions of said annular flanges inwardly to bite into said tubular blank to compress the same instead of expanding it.

LEWEN R. NELSON.